(12) United States Patent
Weaver et al.

(10) Patent No.: US 9,156,195 B2
(45) Date of Patent: Oct. 13, 2015

(54) CLEAR GRAPHIC CLING FILMS

(75) Inventors: Laura Bauerle Weaver, Lake Jackson, TX (US); Jeffrey C. Munro, Houston, TX (US); Sherrika D. Daniel, Manvel, TX (US)

(73) Assignee: Dow Global Techologies LLC, Midland, MI (US)

( * ) Notice: Subject to any disclaimer, the term of this patent is extended or adjusted under 35 U.S.C. 154(b) by 0 days.

(21) Appl. No.: 13/696,771

(22) PCT Filed: Jun. 6, 2012

(86) PCT No.: PCT/US2012/041021
§ 371 (c)(1),
(2), (4) Date: Nov. 7, 2012

(87) PCT Pub. No.: WO2013/002976
PCT Pub. Date: Jan. 3, 2013

(65) Prior Publication Data
US 2014/0220329 A1 Aug. 7, 2014

Related U.S. Application Data

(60) Provisional application No. 61/503,105, filed on Jun. 30, 2011.

(51) Int. Cl.
| | | |
|---|---|---|
| *C08K 5/49* | (2006.01) | |
| *B29C 43/00* | (2006.01) | |
| *C08J 5/18* | (2006.01) | |
| *C08L 23/10* | (2006.01) | |
| *C08L 23/08* | (2006.01) | |
| *C08L 23/14* | (2006.01) | |
| *B29C 43/24* | (2006.01) | |
| *B29C 47/00* | (2006.01) | |

(52) U.S. Cl.
CPC .............. *B29C 43/003* (2013.01); *B29C 43/24* (2013.01); *B29C 47/0004* (2013.01); *C08J 5/18* (2013.01); *C08L 23/08* (2013.01); *C08L 23/0815* (2013.01); *C08L 23/10* (2013.01); *C08L 23/14* (2013.01); *C08J 2323/10* (2013.01); *C08L 2207/064* (2013.01)

(58) Field of Classification Search
CPC C08L 2205/025; C08L 23/0815; C08L 23/14
See application file for complete search history.

(56) References Cited

U.S. PATENT DOCUMENTS

| | | | |
|---|---|---|---|
| 3,645,992 A | 2/1972 | Elston | |
| 5,272,236 A | 12/1993 | Lai et al. | |
| 5,278,272 A | 1/1994 | Lai et al. | |
| 5,504,172 A | 4/1996 | Imuta et al. | |
| 5,747,592 A * | 5/1998 | Huff et al. ...................... | 525/191 |
| 6,171,681 B1 | 1/2001 | Mascarenhas et al. | |
| 6,294,609 B1 * | 9/2001 | Bertin et al. ..................... | 525/57 |
| 6,525,157 B2 | 2/2003 | Cozewith et al. | |
| 6,960,635 B2 | 11/2005 | Stevens et al. | |
| 7,790,281 B2 | 9/2010 | Pip et al. | |
| 7,855,258 B2 | 12/2010 | Datta et al. | |
| 2005/0176892 A1* | 8/2005 | Weaver et al. ................. | 525/194 |
| 2008/0255296 A1 | 10/2008 | Gibbons et al. | |
| 2010/0285253 A1 | 11/2010 | Hughes et al. | |
| 2011/0027590 A1* | 2/2011 | Abe .............................. | 428/412 |

FOREIGN PATENT DOCUMENTS

WO   WO 2009107425 A1 * 9/2009

OTHER PUBLICATIONS

Dow (Nordel EPDM ), 2014.*
Dow (Nordel 4820), 2014.*
PCT/US2012/041021, International Search Report and Written Opinion of the International Searching Authority.
PCT/US2012/041021, International Preliminary Report on Patentability dated Jan. 16, 2014.

* cited by examiner

*Primary Examiner* — Wenwen Cai

(57) ABSTRACT

The instant invention provides a polymer composition suitable for clear graphic cling film applications, method of producing the same, articles made therefrom, and methods for making such articles. The polymer composition suitable for clear graphic cling film applications, according to the present invention, comprises: (a) a polyolefin composition selected from the group consisting of a propylene-based composition as described herein, and an ethylene-based composition as described herein, and (b) one or more alkyl phosphate-based release agent; wherein when said polyolefin composition is formed into a clear graphic cling film having a 7 (±2) mils, said clear graphic cling film has a haze of less than 4 percent, for example from 0.3 to 4 percent, measured according to ASTM-D 1003.

7 Claims, 6 Drawing Sheets

CLEAR GRAPHIC CLING FILMS

CROSS-REFERENCE TO RELATED APPLICATIONS

This application is a non-provisional application claiming priority from the U.S. Provisional Patent Application No. 61/503,105, filed on Jun. 30, 2011, entitled "CLEAR GRAPHIC CLING FILMS," the teachings of which are incorporated by reference herein, as if reproduced in full hereinbelow.

FIELD OF INVENTION

The instant invention relates to a polymer composition suitable for clear graphic cling films, and clear graphic cling films made therefrom.

BACKGROUND OF THE INVENTION

The use of polyvinyl chloride-based compositions in clear graphic cling film applications is generally known. Such films may be prepared via any known processes, for example, via calendaring process. However, there is a need to reduce the use of phthalate-plasticized, or polyvinyl chloride in graphic cling film applications, and instead use films that are substantially free of chlorine or plasticizers. Such plasticizers typically degrade over time, and as a result, the polyvinyl chloride-based film may deform; thus, having less tendency to adhere to glass windows when subjected to long term exposure to sunlight and/or extreme temperatures.

Therefore, there is a need for a polymer composition suitable for clear graphic cling film applications, which is free from phthalate-plasticized polyvinyl chloride, and clear graphic cling films made therefrom while providing improved film properties.

SUMMARY OF THE INVENTION

The instant invention provides a polymer composition suitable for clear graphic cling film applications, method of producing the same, articles made therefrom, and methods for making such articles. The polymer composition suitable for clear graphic cling film applications, according to the present invention, comprises: (a) a polyolefin composition selected from the group consisting of a propylene-based composition, and an ethylene-based composition, wherein the propylene-based composition has an melt flow rate in the range of from 2 to 8 g/10 minutes, a dynamic mechanical spectroscopy (DMS) value in the range of from 3700 to 10100 Pascal-measured at 190° C., and having a crystallinity in the range of from at least 4 percent by weight to 11 percent by weight, and a heat of fusion of in the range of from 6 to 19 Joules/gram, and a DSC melting point of less than 110° C. (measured via DSC, second heat), and wherein the ethylene-based composition has a melt index ($I_2$) in the range of from 0.5 to 5 g/10 minutes, and a density in the range of from 0.865 to 0.880 g/cm$^3$, a DMS value in the range of from 1800 to 17000 Pascal-seconds at 0.1 radian per second, and from 750 to 2200 Pascal-seconds at 100 radian per second measured at 190° C., and having a crystallinity in the range of from at least 14 percent by weight to 20 percent by weight, and a heat of fusion in the range of from 40 to 60 Joules/gram, and a DSC melting point of less than 70° C. (measured via DSC, second heat), and (b) one or more alkyl phosphate-based release agent; wherein when said polyolefin composition is formed into a clear graphic cling film having a 7 (±2) mils, said clear graphic cling film has a haze in the range of from less than 4 percent, for example from 0.3 to 4 percent, measured according to ASTM-D 1003.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

Figure 1:
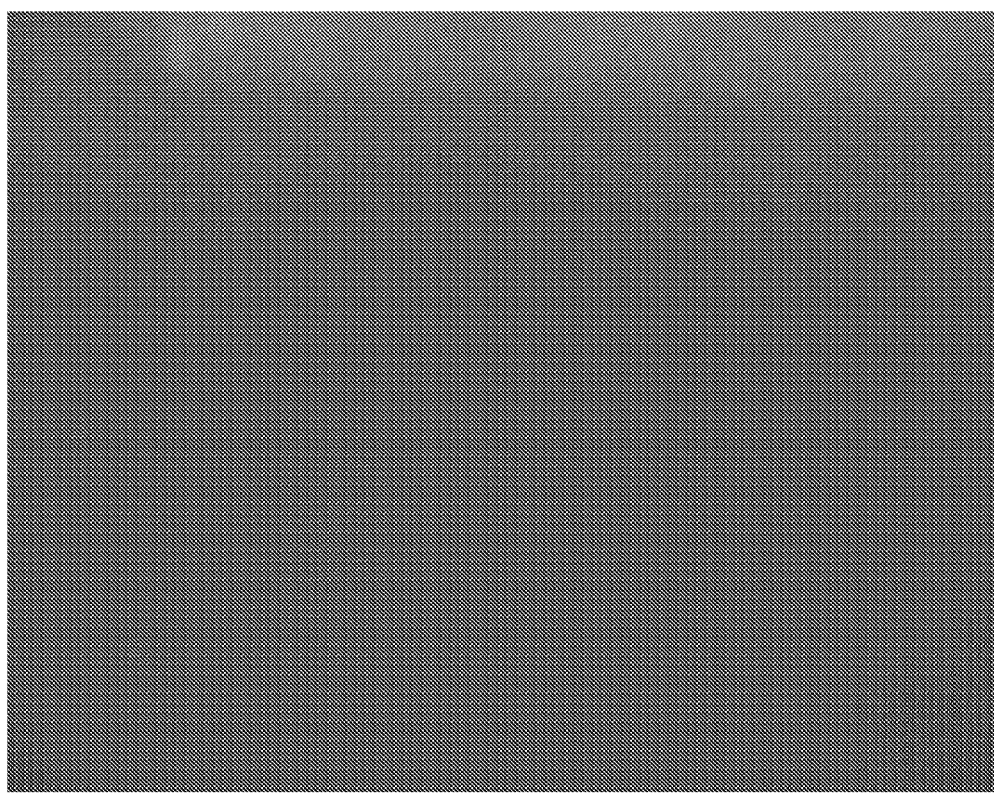
FIG. 1 is a copy of a photograph illustrating ink testing on the inventive film with a red solvent borne flexo ink associated therewith.
Figure 2:
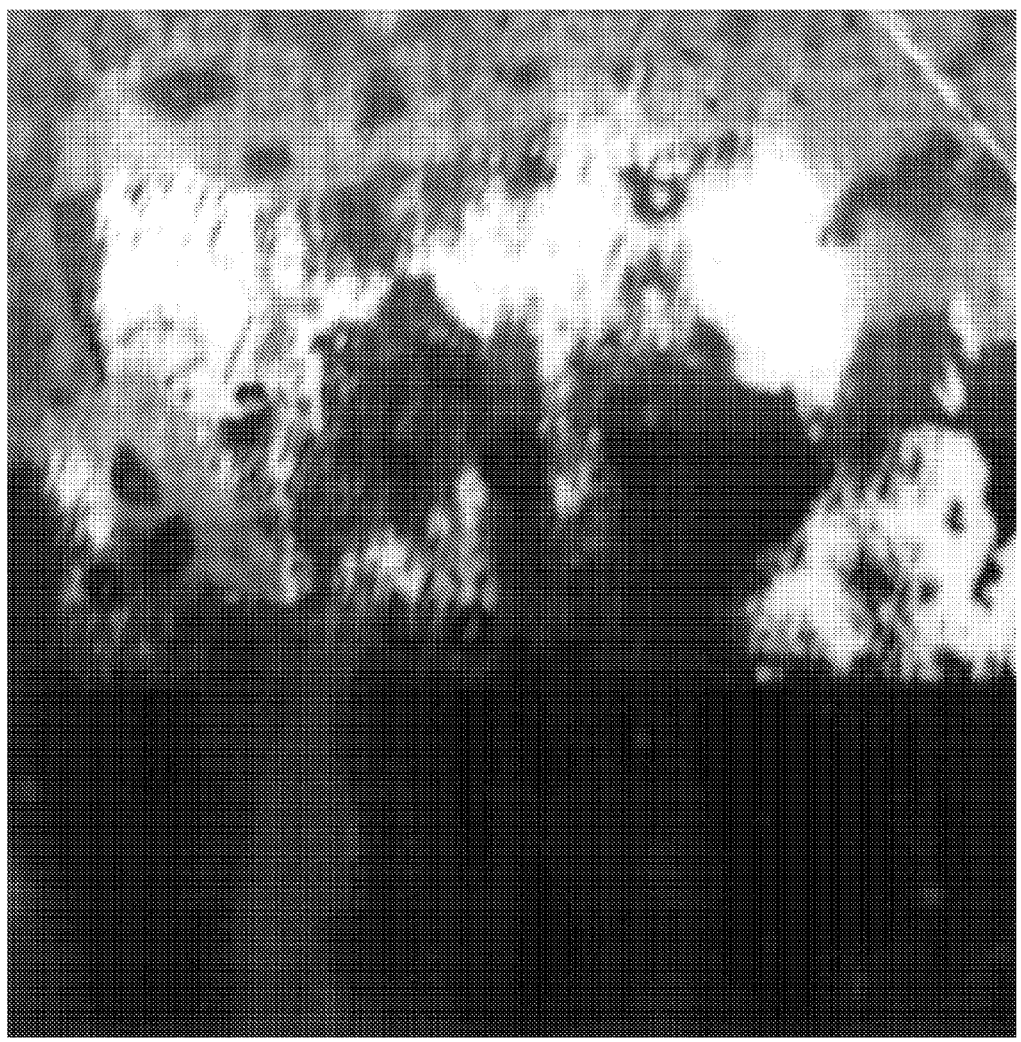
FIG. 2 is a copy of a photograph illustrating ink testing on the inventive film with a blue waterborne flexo ink for flexible vinyls associated therewith.
Figure 3:
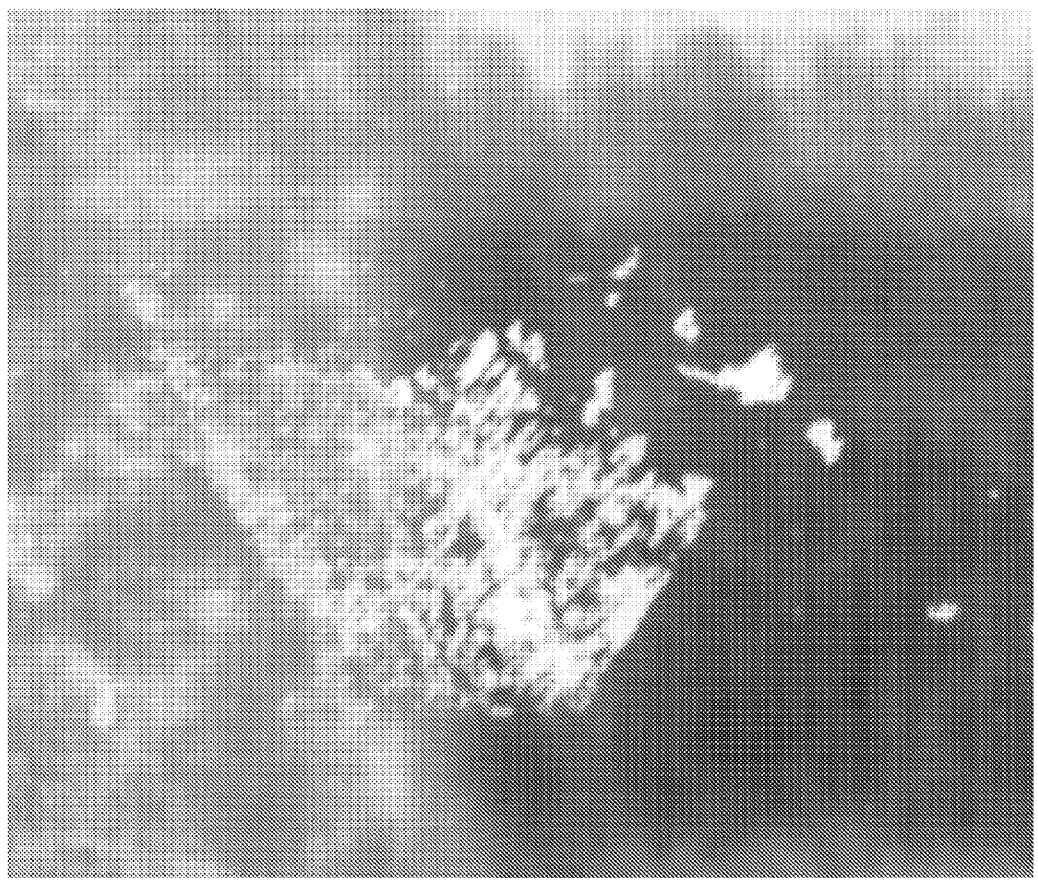
FIG. 3 is a copy of a photograph illustrating ink testing on the inventive film with a green acrylic solution ink for polyester associated therewith.
Figure 4:
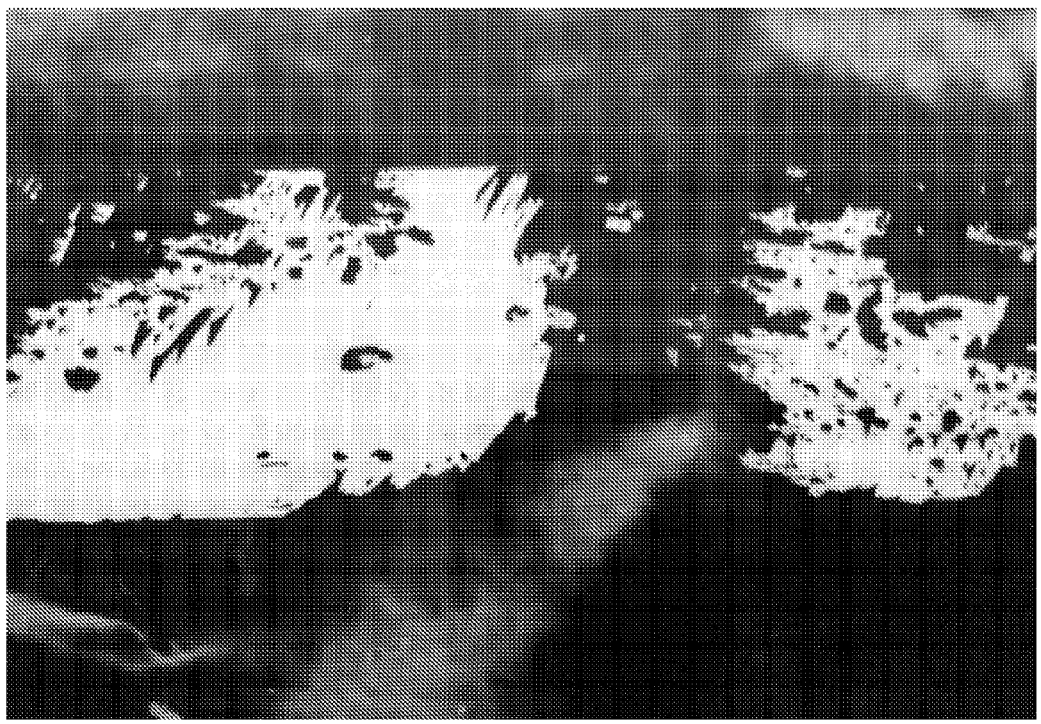
FIG. 4 is a copy of a photograph illustrating ink testing on the inventive film with a black solvent borne ink for vinyl associated therewith.
Figure 5:
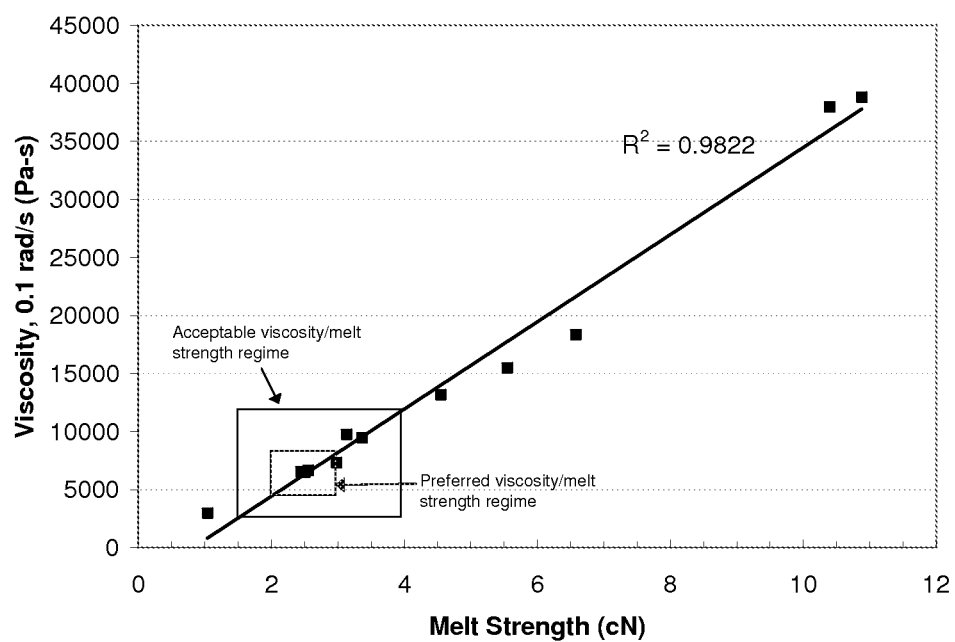
FIG. 5 is a graph illustrating the correlation between melt strength (cN) and dynamic viscosity (0.1 rad/s(Pa·s)) measured at 190° C.
Figure 6:
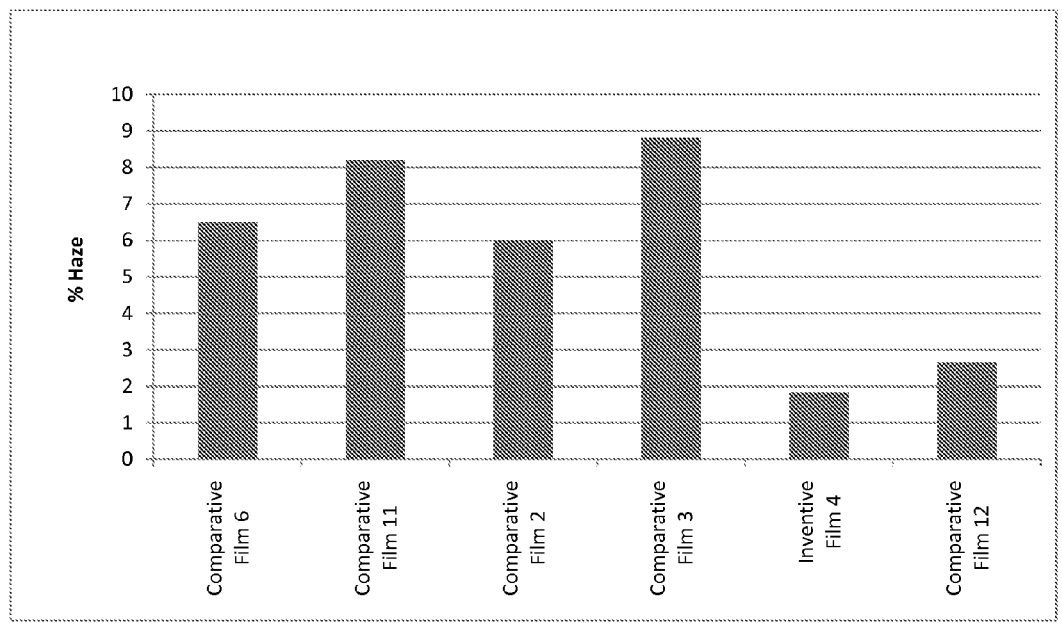
FIG. 6 reports haze (percent) for Inventive Film 4 (7 mils thickness) and Comparative Film 2 (8 mils thickness), Comparative Film 3 (7 mils thickness), Comparative Film 6 (7 mils thickness), Comparative Film 11 (7 mils thickness), and Comparative Film 12 (6 mils thickness).

The instant invention provides a polymer composition suitable for clear graphic cling film applications, method of producing the same, articles made therefrom, and methods for making such articles.

In one embodiment, the instant invention provides a polymer composition suitable for clear graphic cling film applications comprising: (a) a polyolefin composition selected from the group consisting of a propylene-based composition, and an ethylene-based composition, wherein the propylene-based composition has an melt flow rate in the range of from 2 to 8 g/10 minutes, a dynamic mechanical spectroscopy (DMS) value in the range of from 3700 to 10100 Pascal-seconds at 0.1 radian per second, and from 650 to 1200 Pascal-seconds at 100 radian per second measured at 190° C., and having a crystallinity in the range of from at least 4 percent by weight to 11 percent by weight, and a heat of fusion of in the range of from 6 to 19 Joules/gram, and a DSC melting point of less than 110° C. (measured via DSC, second heat), and wherein the ethylene-based composition has a melt index ($I_2$) in the range of from 0.5 to 5 g/10 minutes, and a density in the range of from 0.865 to 0.880 g/cm$^3$, a DMS value in the range of from 1800 to 17000 Pascal-seconds at 0.1 radian per second, and from 750 to 2200 Pascal-seconds at 100 radian per second measured at 190° C., and having a crystallinity in the range of from at least 14 percent by weight to 20 percent by weight, and a heat of fusion in the range of from 40 to 60 Joules/gram, and a DSC melting point of less than 70° C. (measured via DSC, second heat), and (b) one or more alkyl phosphate-based release agent; wherein when said polyolefin composition is formed into a clear graphic cling film having a 7 (±2) mils, said clear graphic cling film has a haze in the range of from less than 4 percent, for example from 0.3 to 4 percent, measured according to ASTM-D 1003.

In an alternative embodiment, the instant invention further provides clear graphic cling films comprising: a polymer composition comprising (a) a polyolefin composition selected from the group consisting of a propylene-based composition, and an ethylene-based composition, wherein the propylene-based composition has an melt flow rate in the range of from 2 to 8 g/10 minutes, a DMS value in the range of from 3700 to 10100 Pascal-seconds at 0.1 radian per second and of from 650 to 1200 Pascal-seconds at 100 radian per second measured at 190° C., and having a crystallinity in the range of from at least 4 percent by weight to 11 percent by weight, and a heat of fusion in the range of from 6 to less than 19 Joules/gram, and a DSC based composition has a melt index ($I_2$) in the range of from 0.5 to 5 g/10 minutes, and a density in the range of from 0.865 to 0.880 g/cm$^3$, a DMS value in the range of from 1800 to 17000 Pascal-seconds at 0.1 radian per second, and from 750 to 2200 Pascal-seconds at 100 radian per second measured at 190° C., and having a crystallinity in the range of from at least 14 percent by weight to 20 percent by weight, and a heat of fusion of in the range of from 40 to 60 Joules/gram, and a DSC melting point (measure via DSC, second heat) of less than 70° C.; and (b) one or more alkyl phosphate-based release agents; wherein said clear graphic cling has a haze in the range of from less than 4 percent, for example, from 0.3 to 4 percent, at a thickness of 7 (±2) mils, measured according to ASTM-D 1003.

In another alternative embodiment, the instant invention further provides a method for forming a clear graphic cling film comprising the steps of: (1) selecting a polymer composition suitable for clear graphic cling film comprising: (a) a polyolefin composition selected from the group consisting of a propylene-based composition, and an ethylene-based composition, wherein the propylene-based composition has an melt flow rate in the range between 2 and 8 g/10 minutes, a DMS value in the range of from 3700 to 10100 Pascal-seconds at 0.1 radian per second, and between 650 to 1200 Pascal-seconds at 100 radian per second measured at 190° C., and having a crystallinity in the range of from at least 4 percent by weight to 11 percent by weight, and a heat of fusion of in the range of from 6 to less than 19 Joules/gram, and a DSC melting point of less than 110° C., and wherein the ethylene-based composition has a melt index ($I_2$) in the range of from 0.5 to 5 g/10 minutes, and a density in the range of from 0.865 and 0.880 g/cm$^3$, a DMS value in the range of from 1800 to 17000 Pascal-seconds at 0.1 radian per second, and of from 750 to 2200 Pascal-seconds at 100 radian per second measured at 190° C., and having a crystallinity in the range of from at least 14 percent by weight to 20 percent by weight, and a heat of fusion of in the range of from 40 to 60 Joules/gram, and a DSC melting point (measured via DSC, second heat) of less 70° C.; and (b) one or more alkyl phosphate-based release agents; (2) forming said polymer composition into a clear graphic cling film via calendaring or cast film extrusion process, wherein said clear graphic cling has a haze in the range of from less than 4 percent, for example from 0.3 to 4 percent, at a thickness of 7 (±2) mils, measured according to ASTM-D 1003.

clear graphic cling film, and method of producing the same, in accordance with any of the preceding embodiments, except that the ethylene-based composition comprises a first ethylene/alpha-olefin copolymer and a second ethylene/alpha-olefin copolymer.

In an alternative embodiment, the instant invention provides a polymer composition, a clear graphic cling film, and method of producing the same, in accordance with any of the preceding embodiments, except that the film has a peel strength (to glass) in the range of from 5 to 20 g/inch (180° peel of 1"×6" strip after aging 72 hr at 60° C.).

In an alternative embodiment, the instant invention provides a polymer composition, a clear graphic cling film, and method of producing the same, in accordance with any of the preceding embodiments, except that the film has tear strength in the range of from 40 to 180 g/mil, according to ASTM-D 1922.

In an alternative embodiment, the instant invention a polymer composition, a clear graphic cling film, and method of producing the same, in accordance with any of the preceding embodiments, except that the film has a tensile modulus (10% modulus in machine direction (MD)) in the range of from 150 to 400 psi, according to ASTM-D 638.

In an alternative embodiment, the instant invention provides a polymer composition, a clear graphic cling film, and method of producing the same, in accordance with any of the preceding embodiments, except that the film has a thickness in the range of from 5 to 10 mils (via micrometer).

In one embodiment, the instant invention provides multilayer structure comprising at least one or more clear graphic cling film layers as described above.

Propylene-Based Composition

The propylene-based composition may comprise from 25 to 75, e.g. from 35 to 65, or in the alternative, from 40 to 60, percent by weight of a first propylene/alpha-olefin copolymer and from 25 to 75, e.g. from 35 to 65, or from 40 to 60, percent by weight of a second propylene/alpha-olefin copolymer, based on the total weight of the propylene-based composition.

The propylene-based composition has an melt flow rate in the range of from 2 to 8 g/10 minutes, a dynamic mechanical spectroscopy (DMS) value in the range of from 3700 to 10100 Pascal-seconds at 0.1 radian per second and from 650 to 1200 Pascal-seconds at 100 radian per second measured at 190° C., and having a crystallinity in the range of from at least 4 percent by for example from 6 to 18 Joules/grams, and a DSC melting point of less than 110° C.; for example, less than 90° C.

First Propylene/Alpha-Olefin Copolymer

The propylene-based composition may comprise from 25 to 75, e.g. from 35 to 65, or in the alternative from 40 to 60, percent by weight of a first propylene/alpha-olefin copolymer.

In one particular embodiment, the first propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; or in another alternative, greater than about 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The first propylene/alpha-olefin copolymer may have a melt flow rate in the range of from 1 to 5 g/10 minutes, measured in accordance with ASTM D-1238 (at 230° C./2.16 Kg). All individual values and subranges from 1 to 5 g/10 minutes are included herein and disclosed herein; for example, the melt flow rate can be from a lower limit of 1 g/10 minutes, 2 g/10 minutes, 2.5 g/10 minutes, or 3 g/10 minutes to an upper limit of 3 g/10 minutes, 4 g/10 minutes, or 5 g/10 minutes. For example, the propylene/alpha-olefin copolymer may have a melt flow rate in the range of from 1 to 5 g/10 minutes; or from 1 to 4 g/10 minutes; or from 1.5 to 5 g/10 minutes; or from 2 to 5 g/10 minutes.

The first propylene/alpha-olefin copolymer has crystallinity in the range of from at least 1 percent by weight (a heat of fusion of at least 2 Joules/gram) to 15 percent by weight (a heat of fusion of less than 25 Joules/gram). All individual values and subranges from 1 percent by weight (a heat of fusion of at least 2 Joules/gram) to 15 percent by weight (a heat of fusion of less than 25 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram), or 4 percent by weight (a heat of fusion of at least 6 Joules/gram) to an upper limit of 15 percent by weight (a heat of fusion of less than 25 Joules/gram), or 11 percent by weight (a 12 Joules/gram). For example, the propylene/alpha-olefin copolymer may have a crystallinity in the range of from at least 1 percent by weight (a heat of fusion of at least 2 Joules/gram) to 15 percent by weight (a heat of fusion of less than 25 Joules/gram); or in the alternative, the propylene/alpha-olefin copolymer may have a crystallinity in the range of from at least 1 percent by weight (a heat of fusion of at least 2 Joules/gram) to 11 percent by weight (a heat of fusion of less than 19 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 12 Joules/gram). The crystallinity is measured via Differential Scanning calorimetry (DSC) method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The first propylene/alpha-olefin copolymer comprises from 10 to 18 percent by weight of units derived from one or more alpha-olefin comonomers. All individual values and subranges from 10 to 18 weight percent are included herein and disclosed herein; for example, the weight percent of units derived from one or more alpha-olefin comonomers can be from a lower limit of 10, 11, 12, or 13 weight percent to an upper limit of 18, 17, 16, 15, or 14 weight percent. For example, the first propylene/alpha-olefin copolymer comprises from 10 to 17 percent by weight of units derived from one or more alpha-olefin comonomers; or in the alternative, the first propylene/alpha-olefin copolymer comprises from 10 to 16 percent by weight of units derived from one or more alpha-olefin comonomers; or in the alternative, the first propylene/alpha-olefin copolymer comprises from 12 to 18 percent by weight of units derived from one or more alpha-olefin comonomers; or in the alternative, first propylene/alpha-olefin copolymer comprises from 12 to 17 percent by weight of units derived from one or more alpha-olefin comonomers; or in the alternative, the first propylene/alpha-olefin copolymer comprises from 10 to 16 percent by weight of units derived from one or more alpha-olefin comonomers.

The first propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0. U.S. Pat. Nos. 6,960,635 and 6,525,157, incorporated herein by reference. Such first propylene/alpha-olefin copolymers are commercially available from The Dow Chemical Company, under the trade name VERSIFY™, or from ExxonMobil Chemical Company, under the trade name VISTAMAXX™.

In one embodiment, the first propylene/alpha-olefin copolymer are further characterized as comprising a g' in the range of from less than 1, as further described in details in the U.S. Provisional Patent Application No. 60/988,999 and International Patent Application No. PCT/US08/082599 (International Publication Number WO 2009/067337).

In one embodiment, the first propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein with reference to such first propylene/alpha olefin copolymers, refers to a chain length of at least one (1) carbon more than a short chain branch; and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically does not exceed 3 long chain branches/1000 total carbons. Such first propylene/alpha-olefin copolymers are further described in details in the U.S. Provisional Patent Application No. 60/988,999 and International Patent Application No. PCT/US08/082599 (International Publication Number WO 2009/067337), each of which is incorporated, herein, by reference.

In certain other embodiments, the first propylene/alpha-olefin copolymer may, for example, be a semi-crystalline polymer and may have a melting point of less than 110° C. In preferred embodiments, the melting point may be from 25 to 100° C. In more preferred embodiments, the melting point may be between 40 and 85° C.

than from 15 percent by weight of a random copolymer polypropylene having a DSC melting point temperature ($T_m$) (measured via DSC, second heat) of greater than 120° C., or having a heterogeneous composition distribution, which is typically prepared via one or more Zeigler-Natta catalysts.

The first propylene/alpha-olefin copolymer may further comprise one or more additives. Such additives include, but are not limited to, dyes, lubricants, fillers, pigments, primary antioxidants, secondary antioxidants, processing aids, UV stabilizers, release agents, anti-blocking agents, and combinations thereof. The first propylene/alpha-olefin copolymer may contain any amounts of such additives. The first propylene/alpha-olefin copolymer may comprise from about 0 to about 10 percent by the combined weight of such additives, based on the weight of first propylene/alpha-olefin copolymer including such additives.

Second Propylene/Alpha-Olefin Copolymer

The propylene-based composition may comprise from 25 to 75, e.g. from 35 to 65; or from 40 to 60, percent by weight of a second propylene/alpha-olefin.

In one particular embodiment, the second propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; or in another alternative, greater than about 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The second propylene/alpha-olefin copolymer has a melt flow rate in the range of from 5.1 to 12 g/10 minutes, measured in accordance with ASTM D-1238 (at 230° C./2.16 Kg). All individual values and subranges from 5.1 to 12 g/10 minutes are included herein and disclosed herein; for example, the melt flow rate can be from a lower limit of 5.1 g/10 minutes, 5.2 g/10 minutes, 5.5 g/10 minutes, or 6 g/10 minutes to an upper limit of 12 g/10 minutes, 10 g/10 minutes, or 9 g/10 minutes. For example, the propylene/alpha-olefin copolymer may have a melt flow rate in the range of from 5.1 to 12 g/10 minutes; or from 5.5 to 12 g/10 minutes; or from 6 to 12 g/10 minutes; or from 6 to 10 g/10 minutes.

least 1 percent by weight (a heat of fusion of at least 2 Joules/gram) to 15 percent by weight (a heat of fusion of less than 25 Joules/gram). All individual values and subranges from 1 percent by weight (a heat of fusion of at least 2 Joules/gram) to 15 percent by weight (a heat of fusion of less than 25 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram), or 4 percent by weight (a heat of fusion of at least 6 Joules/gram) to an upper limit of 15 percent by weight (a heat of fusion of less than 25 Joules/gram), or 11 percent by weight (a heat of fusion of less than 19 Joules/gram), or 7 percent by weight (a heat of fusion of less than 12 Joules/gram). For example, the second propylene/alpha-olefin copolymer may have a crystallinity in the range of from at least 1 percent by weight (a heat of fusion of at least 2 Joules/gram) to 15 percent by weight (a heat of fusion of less than 25 Joules/gram); or in the alternative, the second propylene/alpha-olefin copolymer may have a crystallinity in the range of from at least 1 percent by weight (a heat of fusion of at least 2 Joules/gram) to 11 percent by weight (a heat of fusion of less than 19 Joules/gram); or in the alternative, the second propylene/alpha-olefin copolymer may have a crystallinity in the range of from at least 1 percent by weight (a heat of fusion of at least 2 Joules/gram) to 7 percent by weight (a heat of fusion of less than 12 Joules/gram). The crystallinity is measured via Differential Scanning calorimetry (DSC) method. The second propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The second propylene/alpha-olefin copolymer comprises from 10 to 18 percent by weight of units derived from one or more alpha-olefin comonomers. All individual values and subranges from 10 to 18 weight percent are included herein and disclosed herein; for example, the weight percent of units derived from one or more alpha-olefin comonomers can be from a lower limit of 10, 11, 12, or 13 weight percent to an upper limit of 18, 17, 16, 15, or 14 weight percent. For example, the second propylene/alpha-olefin copolymer comprises from 10 to 17 percent by weight of units derived from one or more alpha-olefin comonomers; or in the alternative, the second propylene/alpha-olefin copolymer comprises from 10 to 16 percent by second propylene/alpha-olefin copolymer comprises from 12 to 18 percent by weight of units derived from one or more alpha-olefin comonomers; or in the alternative, the second propylene/alpha-olefin copolymer comprises from 12 to 17 percent by weight of units derived from one or more alpha-olefin comonomers; or in the alternative, the second propylene/alpha-olefin copolymer comprises from 10 to 16 percent by weight of units derived from one or more alpha-olefin comonomers.

The second propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such second propylene/alpha-olefin copolymers are further described in details in the U.S. Pat. Nos. 6,960,635 and 6,525,157, incorporated herein by reference. Such second propylene/alpha-olefin copolymers are commercially available from The Dow Chemical Company, under the trade name VERSIFY™, or from ExxonMobil Chemical Company, under the trade name VISTAMAXX™.

In one embodiment, the second propylene/alpha-olefin copolymer are further characterized as comprising a g' in the range of from less than 1, further described in details in the U.S. Provisional Patent Application No. 60/988,999 and International Patent Application No. PCT/US08/082599 (International Publication Number WO 2009/067337).

In one embodiment, the second propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein with reference to such propylene/alpha olefin copolymers, refers to a chain length of at least one (1) carbon more than a short chain branch, and short chain branch, as used herein, refers to a chain length of two (2) carbons less than the number of carbons in the comonomer. For example, a propylene/1-length, but these backbones also have short chain branches of only six (6) carbons in length. The maximum number of long chain branches typically it does not exceed 3 long chain branches/1000 total carbons. Such second propylene/alpha-olefin copolymers are further described in details in the U.S. Provisional Patent Application No. 60/988,999 and International Patent Application No. PCT/US08/082599 (International Publication Number WO 2009/067337), each of which is incorporated, herein by reference.

In certain other embodiments, the second propylene/alpha-olefin copolymer may, for example, be a semi-crystalline polymer and may have a melting point of less than 110° C. In preferred embodiments, the melting point may be from 25 to 100° C. In more preferred embodiments, the melting point may be between 40 and 85° C.

In one embodiment, the second propylene/alpha-olefin copolymer may be blended with less than from 15 percent by weight of a random copolymer polypropylene having a DSC melting point temperature ($T_m$)(measured via DSC, second heat) of greater than 120° C., or having a heterogeneous composition distribution, which is typically prepared via one or more Zeigler-Natta catalysts.

The second propylene/alpha-olefin copolymer may further comprise one or more additives. Such additives include, but are not limited to, dyes, lubricants, fillers, pigments, primary antioxidants, secondary antioxidants, processing aids, UV stabilizers, release agents, anti-blocking agents, and combinations thereof. The second propylene/alpha-olefin copolymer may contain any amounts of additives. The second propylene/alpha-olefin copolymer may comprise from about 0 to about 10 percent by the combined weight of such additives, based on the weight of second propylene/alpha-olefin copolymer including such additives.

Ethylene-Based Composition

The ethylene-based composition may comprise from 25 to 75, e.g. from 35 to 65; or from 40 to 60, percent by weight of a first ethylene/alpha-olefin copolymer and from 25 to 75, e.g. from 35 to 65; or from 40 to 60, percent by weight of a second ethylene/alpha-olefin copolymer. In alternative, the ethylene-based composition may consist of only one ethylene/alpha-olefin copolymer.

The ethylene-based composition has a melt index ($I_2$) in the range of from 0.5 and to 5 g/10 minutes, and a density in the range of from 0.865 to 0.880 g/cm$^3$, a DMS value in the range seconds at 100 radian per second measured at 190° C., and having a crystallinity in the range of from at least 14 percent by weight to 20 percent by weight, and a heat of fusion of in the range of from 40 to 60 Joules/gram, and a DSC melting point temperature ($T_m$)(measured via DSC, second heat) of less than 70° C.

First Ethylene/Alpha-Olefin Copolymer

The first ethylene/alpha-olefin copolymer has a density in the range of from 0.860 to 0.885 g/cm$^3$. All individual values and subranges from 0.860 to 0.885 g/cm$^3$ included ncluded herein and disclosed herein; for example, the density can be from a lower limit of from 0.860, 0.865, 0.870, or 0.875 g/cm$^3$ to an upper limit of 0.885, 0.880, 0.877, or 0.875 g/cm$^3$. For example, the first ethylene/alpha-olefin copolymer may have a density in the range of from 0.860 to 0.880 g/cm$^3$; or in the alternative, the first ethylene/alpha-olefin copolymer may have a density in the range of from 0.865 to 0.880 g/cm$^3$.

The first ethylene/alpha-olefin copolymer has a molecular weight distribution ($M_w/M_n$) (measured according to the conventional GPC method) in the range of from 1.5 to 3.0, e.g. from 1.6 to 2.5.

The first ethylene/alpha-olefin copolymer has a melt index ($I_2$) in the range of from 0.2 to 3 g/10 minutes. All individual values and subranges from 0.2 to 3 g/10 minutes are included herein and disclosed herein; for example, the melt index ($I_2$) can be from a lower limit of 0.2, 0.4, or 0.5 g/10 minutes, to an upper limit of 1, 1.5, 2, 2.5, 2.7, 2.9 or 3 g/10 minutes. For example, the first ethylene/alpha-olefin copolymer may have a melt index ($I_2$) in the range of from 0.4 to 2.5 g/10 minutes; or in the alternative, the first ethylene/alpha-olefin copolymer may have a melt index ($I_2$) in the range of from 0.4 to 2 g/10 minutes; or in the alternative, the first ethylene/alpha-olefin copolymer may have a melt index ($I_2$) in the range of from 0.4 to 1.5 g/10 minutes; or in the alternative, the first ethylene/alpha-olefin copolymer may have a melt index ($I_2$) in the range of from 0.4 to 1 g/10 minutes.

The first ethylene/alpha-olefin copolymer has a molecular weight ($M_w$) in the range of from 115,000 to 205,000 daltons.

The first ethylene/alpha-olefin copolymer may comprise from 25 to 40 percent by weight of units derived from one or more α-olefin comonomers. All individual values and subranges from 25 to 40 weight percent are included herein and disclosed herein; for example, the first one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The first ethylene/alpha-olefin copolymer may comprise from 55 to 75 percent by weight of units derived from ethylene. All individual values and subranges from 55 to 75 weight percent are included herein and disclosed herein; for example, the first ethylene/alpha-olefin copolymer may comprise from 55 to 70 percent by weight of units derived from ethylene.

The first ethylene/alpha-olefin copolymer is homogeneously branched, as described in the U.S. Pat. No. 3,645,992, incorporated herein by reference, or linear or substantially linear, as described in the U.S. Pat. Nos. 5,272,236 and 5,278,272, incorporated herein by reference.

The first ethylene/alpha-olefin copolymer has a dynamic mechanical spectroscopy (DMS) value in the range of from 3,200 to 58,000 Pascal-seconds at 0.1 radians per second and from 850 to 3,700 Pascal-seconds at 100 radians per second measured at 190° C.

The first ethylene/alpha-olefin copolymer has crystallinity in the range of from at least 12 percent by weight to 24 percent by weight, and a heat of fusion in the range of from 35 to 70 Joules/gram, and/or a DSC melting point temperature ($T_m$) (measured via DSC, second heat) of less than 70° C.

The first ethylene/alpha-olefin copolymer may further comprise one or more additives. Such additives include, but are not limited to, dyes, lubricants, fillers, pigments, primary antioxidants, secondary antioxidants, processing aids, UV stabilizers, release agents, anti-blocking agents, and combinations thereof. The first ethylene/alpha-olefin copolymer may contain any amounts of additives. The first ethylene/alpha-olefin copolymer may comprise from about 0 to about 10 percent by the combined weight of such additives, based on the weight of first ethylene/alpha-olefin copolymer including such additives. names ENGAGE™ or AFFINITY™ from The Dow Chemical Company, or EXACT™ from ExxonMobil Chemical Company.

Second Ethylene/Alpha-Olefin Copolymer

The second ethylene/alpha-olefin copolymer has a density in the range of from 0.860 to 0.885 g/cm$^3$. All individual values and subranges from 0.860 to 0.885 g/cm$^3$ are included herein and disclosed herein; for example, the density can be from a lower limit of 0.860, 0.865, 0.870, or 0.875 g/cm$^3$ to an upper limit of 0.885, 0.880, 0.877, or 0.875 g/cm$^3$. For example, second ethylene/alpha-olefin copolymer may have a density in the range of from 0.860 to 0.880 g/cm$^3$; or in the alternative, the second ethylene/alpha-olefin copolymer may have a density in the range of from 0.865 to 0.880 g/cm$^3$.

The second ethylene/alpha-olefin copolymer has a molecular weight distribution ($M_w/M_n$) (measured according to the conventional GPC method) in the range of from 1.5 to 3.0, e.g. from 1.6 to 2.5.

The second ethylene/alpha-olefin copolymer has a melt index ($I_2$) in the range of from 3.1 to 8 g/10 minutes. All individual values and subranges from 3.1 to 8 g/10 minutes are included herein and disclosed herein; for example, the melt index ($I_2$) can be from a lower limit of 3.1, 3.5, or 4 g/10 minutes, to an upper limit of 5, 7, or 8 g/10 minutes. For example, the second ethylene/alpha-olefin copolymer may have a melt index ($I_2$) in the range of from 3.5 to 8 g/10 minutes; or in the alternative, the second ethylene/alpha-olefin copolymer may have a melt index ($I_2$) in the range of from 3.5 to 7 g/10 minutes; or in the alternative, the second ethylene/alpha-olefin copolymer may have a melt index ($I_2$) in the range of from 3.5 to 6 g/10 minutes; or in the alternative, the second ethylene/alpha-olefin copolymer may have a melt index ($I_2$) in the range of from 4 to 6 g/10 minutes.

The second ethylene/alpha-olefin copolymer has a molecular weight ($M_w$) in the range of from 90,000 to 115,000 daltons.

The second ethylene/alpha-olefin copolymer may comprise from 25 to 40 percent by weight of units derived from one or more α-olefin comonomers. All individual values and subranges from 25 to 40 weight percent are included herein and disclosed herein; for example, the second ethylene/alpha-olefin copolymer may comprise from 30 to 40 by weight of units derived from one or more α-olefin comonomers. the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The second ethylene/alpha-olefin copolymer may comprise from 55 to 75 percent by weight of units derived from ethylene. All individual values and subranges from 55 to 75 weight percent are included herein and disclosed herein; for example, the second ethylene/alpha-olefin copolymer may comprise from 55 to 70 percent by weight of units derived from ethylene.

The second ethylene/alpha-olefin copolymer of the instant invention is homogeneously branched, as described in the U.S. Pat. No. 3,645,992, incorporated herein by reference, or linear or substantially linear, as described in the U.S. Pat. Nos. 5,272,236 and 5,278,272, incorporated herein by reference.

The second ethylene/alpha-olefin copolymer has a DMS value in the range of from 1,100 to 3,200 Pascal-seconds at 0.1 radian per second, and from 490 to 850 Pascal-seconds at 100 radians per second measured at 190° C.

The second ethylene/alpha-olefin copolymer has crystallinity in the range of from at least 12 percent by weight to 24 percent by weight, and/or a heat of fusion of in the range of from 35 to 70 Joules/gram, and/or a DSC melting point temperature ($T_m$)(measured via DSC, second heat) of less than 70° C.

The second ethylene/alpha-olefin copolymer may further comprise one or more additives. Such additives include, but are not limited to, dyes, lubricants, fillers, pigments, primary antioxidants, secondary antioxidants, processing aids, UV stabilizers, release agents, anti-blocking agents, and combinations thereof. The second ethylene/alpha-olefin copolymer may contain any amounts of additives. The second ethylene/alpha-olefin copolymer may comprise from about 0 to about 10 percent by the combined weight of such additives, based on the weight of second ethylene/alpha-olefin copolymer including such additives. trade names ENGAGE™ or AFFINITY™ from The Dow Chemical Company, or EXACT™ from ExxonMobil Chemical Company.

One or More Alkyl Phosphate-Based Release Agents

The inventive polymer composition suitable for clear graphic cling film comprises less than 2 percent by weight of one or more alkyl phosphate-based release agents; for example, from 0.05 to 1 weight percent; or in the alternative, from 0.05 to 0.5 weight percent; or in the alternative, from 0.05 to 0.3 weight percent; or any alternative, from 0.05 to 0.25 weight percent. Such alkyl phosphate-based release agents are commercially available under trade name AM Fine, for example AM Fine AX-71, from AM Fine.

Process for Producing the Polymer Composition Suitable for Clear Graphic Cling Films and Method of Making Such Films Various polymeric components, as described, can be melt blended via, for example, an extruder, e.g. single or twin screw extruder, in the presence of one or more additives, as described above, for example one or more alkyl phosphate-based release agents, to form the inventive polymer composition in the form of pellets. The inventive polymer composition in the form of pellets may further be processed via calendaring process and/or cast film extrusion process into a film. In the alternative, various polymeric components, as described, can be melt blended via, for example, an extruder, e.g. single or twin screw extruder, in the presence of one or more additives, as described above, for example one or more alkyl phosphate-based release agents, and continuously be formed into film via calendaring process. The inventive film may further be surface treated, for example, via Corona treatment. The inventive film may further be laminated to a substrate, e.g. a release paper, via lamination process. In one embodiment, a multilayer film comprises one or more inventive films, as described herein. Graphics including, but not limited to, designs, letters, drawings, figures, and photographs, may be placed on at least one surface of the film comprising the inventive composition via any conventional methods including, but not limited to, offset lithography, digital printing, and gravure. Such graphic films may be used point-of-purchase advertising or holiday art advertising, preferably placed on window glass.

The inventive film has a peel strength (to glass) in the range of from 5 to 20 g/inch (180° peel of 1"×6" strip after aging 72 hr at 60° C.), and/or the inventive film has tear strength in the tensile modulus (10% modulus in machine direction (MD)) in the range of from 150 to 400 psi, according to ASTM-D 638, and/or the inventive film has a thickness in the range of from 5 to 10 mils (via micrometer).

EXAMPLES

Formulation Components

AM Fine AX-71 is an alkyl phosphate-based release agent having an average molecular weight of 490, and a melting point temperature in the range of from 70 to 75° C., which is commercially available from Amfine Chemical Corporation.

ENGAGE 7380 is an ethylene/butene copolymer having a target density of 0.870 g/cm$^3$, a target melt index ($I_2$) of less than 0.5 g/10 minutes, a DSC melting peak of approximately 50° C.

ENGAGE 7387 is an ethylene/butene copolymer having a target density of 0.870 g/cm$^3$, a target melt index ($I_2$) of less than 0.5 g/10 minutes, a DSC melting peak of approximately 50° C.

ENGAGE 7447 is an ethylene/butene copolymer having a target density of 0.865 g/cm$^3$, a target melt index ($I_2$) of 5 g/10 minutes, a DSC melting peak of approximately 35° C.

ENGAGE 8150 is an ethylene/octene copolymer having a target density of 0.868 g/cm$^3$, a target melt index ($I_2$) of 0.5 g/10 minutes, a DSC melting peak of approximately 55° C.

ENGAGE 8200 is an ethylene/octene copolymer having a target density of 0.870 g/cm$^3$, a target melt index ($I_2$) of 5 g/10 minutes, a DSC melting peak of approximately 59° C.

ENGAGE 8452 is an ethylene/octene copolymer having a target density of 0.875 g/cm$^3$, a target melt index ($I_2$) of 3 g/10 minutes, a DSC melting peak of approximately 66° C.

AFFINITY 8200 is an ethylene/octene copolymer having a target density of 0.870 g/cm$^3$, a target melt index ($I_2$) of 5 g/10 minutes, a DSC melting peak of approximately 63° C.

VERSIFY 2400.05 is a propylene/ethylene copolymer having a target melt flow rate of 2 g/10 minutes, a DSC melting peak of approximately 55° C.

VERSIFY 3300.05 is a propylene/ethylene copolymer having a target melt flow rate of 8 g/10 minutes, a DSC melting peak of approximately 62° C.

VERSIFY 3401.05 is a propylene/ethylene copolymer having a target melt flow rate of 25 g/10 minutes, a DSC melting peak of approximately 64° C.

3 g/10 minutes.

VISTAMAXX 6202 is a propylene/ethylene copolymer having a target melt flow rate of 18 g/10 minutes.

PVC is a polyvinyl chloride film, which is available under the trade name Grafix® Cling Vinyl clear sheet (product #KCF6-C) from Grafix.

Inventive Compositions 1-8

Inventive Compositions 1-8 were prepared according to the following process, based on the formulation components reported in Table 1, as described above. Formulation components reported in Table 1 were melt-blended via a twin-screw extruder, Coperion 25 equipped with a water bath and strand cutter, to form Inventive Compositions 1-8, according to process conditions reported in Table 2. Inventive Compositions 1-8 were tested for their properties, and those properties are reported in Table 3.

Comparative Compositions 1-12

Comparative Compositions 1-11 were prepared according to the following process, based on the formulation components reported in Table 4, as described above. Comparative Composition 12 is commercially available sample, which is based on the formulation components reported in Table 4. With regard to comparative compositions 1-11, formulation components reported in Table 4 were melt-blended via a twin-screw extruder, Coperion 25 equipped with a water bath and strand cutter and ZSK30 equipped with a Gala underwater pelletizer, to form Comparative Compositions 1-3 and 5-7, and Comparative Compositions 4 and 8-11, respectively, according to process conditions reported in Table 2. Comparative Compositions 1-12 were tested for their properties, and those properties are reported in Table 5.

Inventive Films 1-8

Inventive Compositions 1-8 were formed into Inventive Films 1-8 according to the following process and process conditions reported in Table 6. Inventive Examples 1-8 were formed into Inventive Films 1-8 via cast film process on a Collin cast film line (Type: Chill Roll, No. 4430-50-07) according to the process conditions reported in Table 6. Monolayer films were prepared by extruding the same polymer composition through three parallel extruders (2 Collin Type E25P single screw extruders and 1 Collin Type E30P single screw extruder). The three extruders were fed into a single 12 inch wide film die with a die gap of approximately 10 mil held at 20° C. The film was then passed through several rollers and onto a film winder. Inventive Examples 1-8 were tested for their properties, and those properties are listed in Table 7.

Comparative Films 1-12

Comparative Compositions 1-3 and 5-11 were formed into Comparative Films 1-3 and 5-11 according to the following process and process conditions reported in Table 6. Comparative Compositions 1-3 and 5-11 were formed into Comparative Films 1-3 and 5-11 via cast film process on a Collin cast film line (Type: Chill Roll, No. 4430-50-07) according to the process conditions reported in Table 6. Monolayer films were prepared by extruding the same polymer composition through three parallel extruders (2 Collin Type E25P single screw extruders and 1 Collin Type E30P single screw extruder). The three extruders were fed into a single 12 inch wide film die with a die gap of approximately 10 mil (0.010 inches). The molten polymer was then extruded onto a polished stainless steel chill roll held at 20° C. The film was then passed through several rollers and onto a film winder. Comparative Composition 4 was formed into Comparative Film 4 via compression molding on a Carver Automatic Hydraulic Hot Press according to ASTM D4703. Comparative Film 12 was used in its commercially available form, as described above. Comparative Examples 1-12 were tested for their properties, and those properties are listed in Table 8.

TABLE 1

| Material | Inventive Composition 1 wt % | Inventive Composition 2 wt % | Inventive Composition 3 wt % | Inventive Composition 4 wt % | Inventive Composition 5 wt % | Inventive Composition 6 wt % | Inventive Composition 7 wt % | Inventive Composition 8 wt % |
| --- | --- | --- | --- | --- | --- | --- | --- | --- |
| VERSIFY 2400.05 | 74.9 | 74.9 | 49.9 | 49.9 | 24.9 | 24.9 | — | — |
| VERSIFY 3300.05 | 24.9 | — | 49.9 | — | 74.9 | — | — | — |
| VERSIFY 3401.05 | — | 24.9 | — | 49.9 | — | 74.9 | — | — |
| ENGAGE 8150 | — | — | — | — | — | — | 49.9 | — |
| ENGAGE 8200 | — | — | — | — | — | — | 49.9 | — |
| ENGAGE 8452 | — | — | — | — | — | — | — | 99.8 |
| AM Fine AX-71 | 0.2 | 0.2 | 0.2 | 0.2 | 0.2 | 0.2 | 0.2 | 0.2 |

TABLE 2

| | Coperion 25 | ZSK30 |
| --- | --- | --- |
| Zone 1 (° C.) | 140 | 120 |
| Zone 2 (° C.) | 170 | 190 |
| Zone 3 (° C.) | 170 | 190 |
| Zone 4 (° C.) | 170 | 190 |
| Zone 5 (° C.) | 170 | 190 |
| Zone 6 (° C.) | 170 | — |
| Zone 7 (° C.) | 170 | — |
| Zone 8 (° C.) | 170 | — |
| Die Temp (° C.) | — | 130 |
| Adaptor Temp (° C.) | — | 180 |
| Screw Speed (rpm) | 300 | 150 |
| Pelletizer speed (rpm) | — | 1200 |
| Water temp (° C.) | 15-20 | 15-20 |
| Feeder #1 set point (lb/hr) | 30 | 15 |

TABLE 3

| Property | Inventive Composition 1 | Inventive Composition 2 | Inventive Composition 3 | Inventive Composition 4 | Inventive Composition 5 | Inventive Composition 6 | Inventive Composition 7 | Inventive Composition 8 |
|---|---|---|---|---|---|---|---|---|
| Density (g/cm$^3$) | 0.86 | 0.86 | 0.86 | 0.86 | 0.86 | 0.86 | 0.87 | 0.875 |
| Tg (° C.) | −30 | −30 | −29 | −30 | −28 | −30 | −50 | −51 |
| % Crystallinity (ranges) | 4-11 | 4-7 | 4-11 | 4-7 | 4-11 | 4-7 | 17.0 | 20 |
| Melt Strength (cN) | 3.4 | 3.1 | 2.6 | 2.5 | — | — | 3.0 | 2.0 |
| Viscosity, 190° C., 0.1 rad/s (Pa-s) | 9490 | 9748 | 6662 | 6541 | 4803 | 3994 | 7310 | 3086 |
| Viscosity, 190° C., 0.1 rad/s (Pa-s) | 960 | 984 | 821 | 838 | 736 | 708 | 1242 | 834 |

TABLE 4

| Material | Comparative Composition 1 wt % | Comparative Composition 2 wt % | Comparative Composition 3 wt % | Comparative Composition 4 wt % | Comparative Composition 5 wt % | Comparative Composition 6 wt % |
|---|---|---|---|---|---|---|
| VERSIFY 2400.05 | 99.8 | — | — | — | — | — |
| VERSIFY 3300.05 | — | 99.8 | — | — | — | — |
| VERSIFY 3401.05 | — | — | 99.8 | — | — | — |
| VISTAMAXX 6102 | — | — | — | 49.9 | — | — |
| VISTAMAXX 6202 | — | — | — | 49.9 | — | — |
| ENGAGE 8150 | — | — | — | — | 99.8 | — |
| ENGAGE 8200 | — | — | — | — | — | 99.8 |
| AFFINITY 8200 | — | — | — | — | — | — |
| ENGAGE 7380 | — | — | — | — | — | — |
| ENGAGE 7387 | — | — | — | — | — | — |
| ENGAGE 7447 | — | — | — | — | — | — |
| AM Fine AX-71 | 0.2 | 0.2 | 0.2 | 0.2 | 0.2 | 0.2 |
| PVC | — | — | — | — | — | — |

| Material | Comparative Composition 7 wt % | Comparative Composition 8 wt % | Comparative Composition 9 wt % | Comparative Composition 10 wt % | Comparative Composition 11 wt % | Comparative Composition 12 wt % |
|---|---|---|---|---|---|---|
| VERSIFY 2400.05 | — | — | — | — | — | — |
| VERSIFY 3300.05 | — | — | — | — | — | — |
| VERSIFY 3401.05 | — | — | — | — | — | — |
| VISTAMAXX 6102 | — | — | — | — | — | — |
| VISTAMAXX 6202 | — | — | — | — | — | — |
| ENGAGE 8150 | — | — | — | — | — | — |
| ENGAGE 8200 | — | — | — | — | — | — |
| AFFINITY 8200 | 99.8 | — | — | — | — | — |
| ENGAGE 7380 | — | 99.8 | — | — | — | — |
| ENGAGE 7387 | — | — | 99.8 | 49.9 | — | — |
| ENGAGE 7447 | — | — | — | 49.9 | 99.8 | — |
| AM Fine AX-71 | 0.2 | 0.2 | 0.2 | 0.2 | 0.2 | — |
| PVC | — | — | — | — | — | 100% |

TABLE 5

| Property | Comparative Composition 1 | Comparative Composition 2 | Comparative Composition 3 | Comparative Composition 4 | Comparative Composition 5 | Comparative Composition 6 |
|---|---|---|---|---|---|---|
| Density (g/cm$^3$) | 0.86 | 0.87 | 0.87 | 0.86 | 0.87 | 0.87 |
| Tg (° C.) | −30 | −27 | −30 | — | −50 | −50 |
| % Crystallinity (ranges) | 4 | 11 | 7 | — | 18 | 17 |
| Melt Strength (cN) | 4.6 | — | — | 1.0 | 6.6 | — |
| Viscosity, 190° C., 0.1 rad/s (Pa-s) | 13160 | 3155 | 2609 | 2975 | 18340 | 1699 |
| Viscosity, 190° C., 0.1 rad/s (Pa-s) | 1113 | 628 | 606 | 815 | 1859 | 696 |

| Property | Comparative Composition 7 | Comparative Composition 8 | Comparative Composition 9 | Comparative Composition 10 | Comparative Composition 11 | Comparative Composition 12 |
|---|---|---|---|---|---|---|
| Density (g/cm$^3$) | 0.87 | 0.87 | 0.87 | 0.87 | 0.87 | — |
| Tg (° C.) | −50 | −50 | −50 | −50 | −50 | — |
| % Crystallinity (ranges) | 17 | 17 | 17 | 16 | 15 | — |
| Melt Strength (cN) | — | 10.4 | 10.9 | 5.6 | — | — |
| Viscosity, 190° C., 0.1 rad/s (Pa-s) | 1645 | 37942 | 38806 | 15494 | 1735 | — |
| Viscosity, 190° C., 0.1 rad/s (Pa-s) | 708 | 2601 | 2714 | 1981 | 828 | — |

TABLE 6

| Extruder Conditions | | | |
|---|---|---|---|
| | Extruder 1 - Collin Type E25P | Extruder 2 - Collin Type E30P | Extruder 3 - Collin Type E25P |
| Inlet temp (° C.) | 28 | 30 | 28 |
| Cylinder 1 Temp (° C.) | 140 | 140 | 140 |
| Cylinder 2 Temp (° C.) | 180 | 180 | 180 |
| Cylinder 3 Temp (° C.) | 190 | 190 | 190 |
| Cylinder 4 Temp (° C.) | 190 | 190 | 190 |
| Adapter Temp (° C.) | 190 | 190 | 190 |
| Screw speed (rpm) | 35 | 35 | 35 |
| Feed rate (kg/h) | 1.7 | 3.5 | 1.7 |
| Die Temp (° C.) | 190 | 190 | 190 |

| Film Line Conditions | |
|---|---|
| Take-off speed 1 (m/min) | 3 |
| Take-off speed 2 (m/min) | 3.6 |
| Winder speed 1 (%) | 12 |
| Winder speed 2 (%) | 12 |
| Dancer roll weight (N) | 50 |
| Air knife blower (%) | 20 |
| Throughput (kg/h) | 6.9 |
| Chill roll temperature (° C.) | 20 |
| Die Gap (mil) | 10 |

TABLE 7

| Property | Inventive Film 1 | Inventive Film 2 | Inventive Film 3 | Inventive Film 4 | Inventive Film 5 | Inventive Film 6 | Inventive Film 7 | Inventive Film 8 |
|---|---|---|---|---|---|---|---|---|
| Haze (%) | 6.4 | 0.9 | 2 | 0.8 | 0.7 | 0.6 | 1.3 | 1.7 |
| Peel Strength, glass (g/in) | 6.5 | 8.7 | 5.3 | 9.1 | 6 | 6.5 | 7.4 | 6.1 |
| Tear strength, MD (g/mil) | | 123 | 155 | 139 | 173 | 148 | 49 | 80 |
| 10% Modulus, MD (psi) | 279 | 293 | 328 | 308 | 346 | 319 | 175 | 219 |

TABLE 7-continued

| Property | Inventive Film 1 | Inventive Film 2 | Inventive Film 3 | Inventive Film 4 | Inventive Film 5 | Inventive Film 6 | Inventive Film 7 | Inventive Film 8 |
|---|---|---|---|---|---|---|---|---|
| Thickness (mil) | 8 | 7 | 8 | 7 | 7 | 7 | 7 | 7 |

TABLE 8

| Property | Comparative Film 1 | Comparative Film 2 | Comparative Film 3 | Comparative Film 4 | Comparative Film 5 | Comparative Film 6 |
|---|---|---|---|---|---|---|
| Haze (%) | 2.2 | 0.6 | 2.1 | 5.1 | 1.1 | 1.9 |
| Peel Strength, glass (g/in) | 8.2 | 4.6 | 5.8 | 5.6 | 5.3 | 4.7 |
| Tear strength, MD (g/mil) | 139 | 176 | 178 | 95 | 25 | 81 |
| 10% Modulus, MD (psi) | 291 | 383 | 329 | 127 | 171 | 184 |
| Thickness (mil) | 7 | 8 | 7 | 7 | 6 | 7 |

| Property | Comparative Film 7 | Comparative Film 8 | Comparative Film 9 | Comparative Film 10 | Comparative Film 11 | Comparative Film 12 |
|---|---|---|---|---|---|---|
| Haze (%) | 1.2 | 3.1 | 10.9 | 5.5 | 5.4 | 2.1 |
| Peel Strength, glass (g/in) | 4.2 | 4.9 | 3.7 | 6.7 | 20.3 | 11.4 |
| Tear strength, MD (g/mil) | 70 | 19 | 14 | 21 | 29 | 170 |
| 10% Modulus, MD (psi) | 184 | 156 | 141 | 115 | 91 | 622 |
| Thickness (mil) | 7 | 7 | 7 | 7 | 7 | 6 |

Test methods include the following:

Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt index ($I_2$) was measured at 190° C. under a load of 2.16 kg according to ASTM D-1238-03.

Melt index ($I_{10}$) was measured at 190° C. under a load of 10.0 kg according to ASTM D-1238-03.

Melt flow rate was measured at 230° C. under a load of 2.16 kg according to ASTM D-1238-03.

Dynamic mechanical spectroscopy (DMS) was measured on an Advanced Rheometric Expansion System (ARES) equipped with 25 mm parallel plates. Constant temperature dynamic frequency sweeps in the frequency range of 0.1 to 100 rad/s are performed under nitrogen purge at 190° C. Samples are compression molded into 25.4 mm diameter, 3.1 mm thick pucks at 190° C. under 20,000 psi pressure. The sample is placed on the plate and allowed to melt for 5 minutes. The plates are then closed to a gap of 2.0 mm and the sample trimmed to 25 mm in diameter. The sample is allowed to equilibrate at 190° C. for 5 minutes before starting the test. The complex viscosity is measured at a constant strain amplitude of 10%.

Haze was measured according to ASTM D-1003.

10% Modulus in Machine Direction is measured according to ASTM D-882.

Peel strength from glass is measured according to 180° peel of 1"×6" strip after aging 72 hr at 60° C.

Tear strength in Machine Direction is measured according to ASTM D-1922.

Thickness is measured via a micrometer.

Glass transition temperature ($T_g$) is derived from DSC melting curve.

DSC melting point temperature ($T_m$) is derived from DSC melting curve.

Heat of fusion is derived from DSC melting curve.

Differential Scanning calorimetry (DSC) is based on the following. All of the results reported here were generated via a TA Instruments Model Q1000 DSC equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg) and then crimped shut. The thermal behavior of the sample was investigated with the following temperature profile: The sample was rapidly heated to 180° C. and held isothermal for 3 minutes in order to remove any previous thermal history. The sample was then cooled to −80° C. at 10° C/min cooling rate and was held at −80° C. for 3 minutes. The sample was then heated to 180° C. at 10° C./min heating rate. The cooling and second heating curves were recorded.

Dynamic mechanical spectroscopy (DMS) is measured at 190° C.

Melt strength was measured via Goettfert Rheotens.

The present invention may be embodied in other forms without departing from the spirit and the essential attributes thereof, and, accordingly, reference should be made to the appended claims, rather than to the foregoing specification, as indicating the scope of the invention.

The invention claimed is:

1. A polymer composition suitable for clear graphic cling film comprising a propylene-based composition, wherein the propylene-based composition has an melt flow rate in the range of from 2 and 8 g/10 minutes, a dynamic mechanical spectroscopy (DMS) value in the range of from 3700 to 10100 Pascal·second at 0.1 radian per second and from 650 to 1200 Pascal·second at 100 radian per second measured at 190° C., a crystallinity in the range of from at least 4 percent by weight to 11 percent by weight, a heat of fusion in the range of from 6 to 19 Joules/gram, and a DSC melting point of less than 110° C., and one or more alkyl phosphate-based release agent; and
wherein the propylene-based composition comprises a first propylene/alpha-olefin copolymer that has a melt flow rate from 1 to 5 g/10 min, and a second propylene/alpha-olefin copolymer that has a melt flow rate from 5.1 to 12 g/10 min; and wherein when the propylene-based composition is formed into a clear graphic cling film having a 7 (±2) mils, the clear graphic cling film has a haze of less than 4 percent, measured according to ASTM-D 1003.

2. The composition of claim 1, wherein the propylene-based composition comprises from 25 to 75 percent by weight of the first propylene/alpha-olefin copolymer.

3. The composition of claim 2, wherein the propylene-based composition comprises from 25 to 75 percent by weight of the second propylene/alpha-olefin copolymer.

4. The composition of claim 1, wherein the first propylene/alpha-olefin copolymer has a melt flow rate from 2 to 5 g/10 min.

5. The composition of claim 4, wherein the second propylene/alpha-olefin copolymer has a melt flow rate from 6 to 10 g/10 min.

6. An article made from the composition of claim 1.

7. A method to form a clear graphic cling film, comprising extruding the composition of claim 1.

* * * * *